United States Patent [19]

Giacomini

[11] Patent Number: 4,523,384
[45] Date of Patent: Jun. 18, 1985

[54] METHOD AND APPARATUS FOR MEASURING DEVIATIONS IN VEHICLE BODIES OR FRAMES

[75] Inventor: Gian F. Giacomini, Örebro, Sweden

[73] Assignee: Applied Power Inc., Milwaukee, Wis.

[21] Appl. No.: 592,250

[22] Filed: Mar. 22, 1984

[51] Int. Cl.³ .............................................. G01B 5/25
[52] U.S. Cl. ................................... 33/180 AT; 33/288
[58] Field of Search .......... 33/180 AT, 181 AT, 288, 33/335

[56] References Cited

U.S. PATENT DOCUMENTS

| | | | |
|---|---|---|---|
| Re. 31,000 | 7/1982 | Le Grand et al. | 33/180 AT |
| 4,098,003 | 7/1978 | Négrin | 33/180 AT |
| 4,207,681 | 6/1980 | Bayorgeon et al. | 33/180 AT |
| 4,342,154 | 8/1982 | Le Grand | 33/180 AT |
| 4,479,305 | 10/1984 | Wendl et al. | 33/180 AT |

Primary Examiner—Willis Little
Attorney, Agent, or Firm—John J. Byrne; Bradford E. Kile; Kevin M. O'Brien

[57] ABSTRACT

Disclosed is a method and apparatus for measuring deviations in vehicle bodies or frames in connection with inspection of damage or alignment of deformed vehicles. The measuring apparatus comprises gripping means which are attached to reference points on either side of the vehicle, transverse beams having graduated scales thereon, a center beam, a measuring beam and at least one measuring rod for direct or cross measurement. The device is relatively light weight and compact, and the beams are provided with quick couple attachments so that the measurement can be performed in a relatively short time period.

12 Claims, 7 Drawing Figures

METHOD AND APPARATUS FOR MEASURING DEVIATIONS IN VEHICLE BODIES OR FRAMES

BACKGROUND OF THE INVENTION

This invention relates to a measuring method and to a measuring device for measuring deviation in the form of vehicle bodies or frames, often in connection with inspection of damage or alignment of deformed vehicles.

The measuring method is carried out in such a way that four gripping means are clamped in four undamaged reference points located in the middle section of the vehicle. The gripping means are in turn combined with a measuring frame which is oriented in a plane parallel to the ground plane of the vehicle. A measuring beam provided with the necessary measuring means is then quick coupled parallelly to the ground plane of the measuring frame and the vehicle so that all the other reference points of the vehicle can be rapidly controlled by measurement.

The measuring frame of the present invention can be dismantled in short sections, and can be easily accommodated in a usual suitcase. The measuring frame is further provided with a telescopic measuring rod by which the necessary crosswise measurements can be rapidly carried out.

The invention is able to detect small deformations (about 80% of all cases) that are rarely put onto a levelling bench or the like for reasons of time and costs. Thus, this invention creates a very rapid, cheap and portable diagnostic instrument which is of a special interest for insurance companies, trading companies, research laboratories, police etc., which are often not directly engaged in motor car repair activities but which still need to evaluate vehicles in a simple, quick and cheap way.

According to known techniques as described in BD-AS No. 2,246,011, BD-AS No. 2,324,530, U.S. Pat. No. 3,805,396 and SW No. 7,513,214-5, vehicle body frame measurements are typically carried out by means of heavy, bulky and expensive measuring frames or measuring jigs, which are normally not engaged in instances of small deformations or suspicion of a possible deformation. Vehicle bodies and frames are often not measured in instances of small deviation because at present there is lacking a light, portable, quickly adjustable and simple measuring device which can provide the desired measuring result within some minutes and which is therefore not prevented by high working costs. Also, in a usual simple crosswise measurement, there is a further risk of an erroneous diagnosis on account of the fact that the measurement, as a rule, is carried out only in two dimensions. Therefore this prior method is not sufficiently safe.

SUMMARY OF THE INVENTION

The present invention is directed to a method and apparatus for measuring deviation in vehicle bodies and frames in order to determine the extent of damage, whether a certain vehicle can be repaired and if a vehicle can be considered as aligned in a traffic-safe and acceptable manner.

According to the new method, a specially constructed gripping means is clamped in four undamaged reference points in the middle section of the vehicle so that two transverse beams can be quick coupled to said gripping means. The transverse beams will then form together with a longitudinal center beam an H-shaped measuring frame which is in a plane parallel to the ground plane of the vehicle. A measuring beam is then quick coupled with movable attaching means to said transverse beams so that the measuring beam can be given an arbitrary orientation in a plane parallel to the ground plane of the vehicle.

The measuring beam of the present invention has been provided with a measuring means for vertical measurement perpendicular to the ground plane of the vehicle. Crosswise measurement can then be carried out in such a way that a telescopic measuring rod with a measuring tip in one end and a means for quick coupling with a ball joint in the other end is attached to fixed balls which have been adapted to the transverse beams and to the center beam.

One essential advantage of this invention is that it takes very little space under the vehicle and leaves the floor below free so that an operator is able to work with the car in an upright position without disturbing obstacles. Other advantages of the present invention are that the complete device may weigh as little as about 15 kg, as it is made of aluminium, and the device can be simply accommodated and transported in a usual suitcase.

The present invention is described below in detail in connection with selected illustrative examples. The characteristics of the invention are further illustrated by the following claims.

DETAILED DESCRIPTION OF THE PRESENTLY PREFERRED EMBODIMENT

With reference to FIGS. 1–6A, wherein like numerals indicate like parts, a preferred embodiment of the present invention is shown. Transverse beams 1 and 2 are made of an aluminium profile with grooves 37 for simple fitting of mounting irons 34 and 35, and have threaded holes in which different mounting and screwing operations can be easily carried out. Also, a center beam 3 with the same profile as the transverse beams 1 and 2 is shown. The center beam is placed at the center on top of the transverse beams 1 and 2 with the aid of locking irons 27 and locking screw 28, not shown, the former being provided with a taper guide 29 in order that the center beam might be clamped to the two transverse beams 1 and 2 and form a fixed frame for the whole measuring device.

Figure 1:
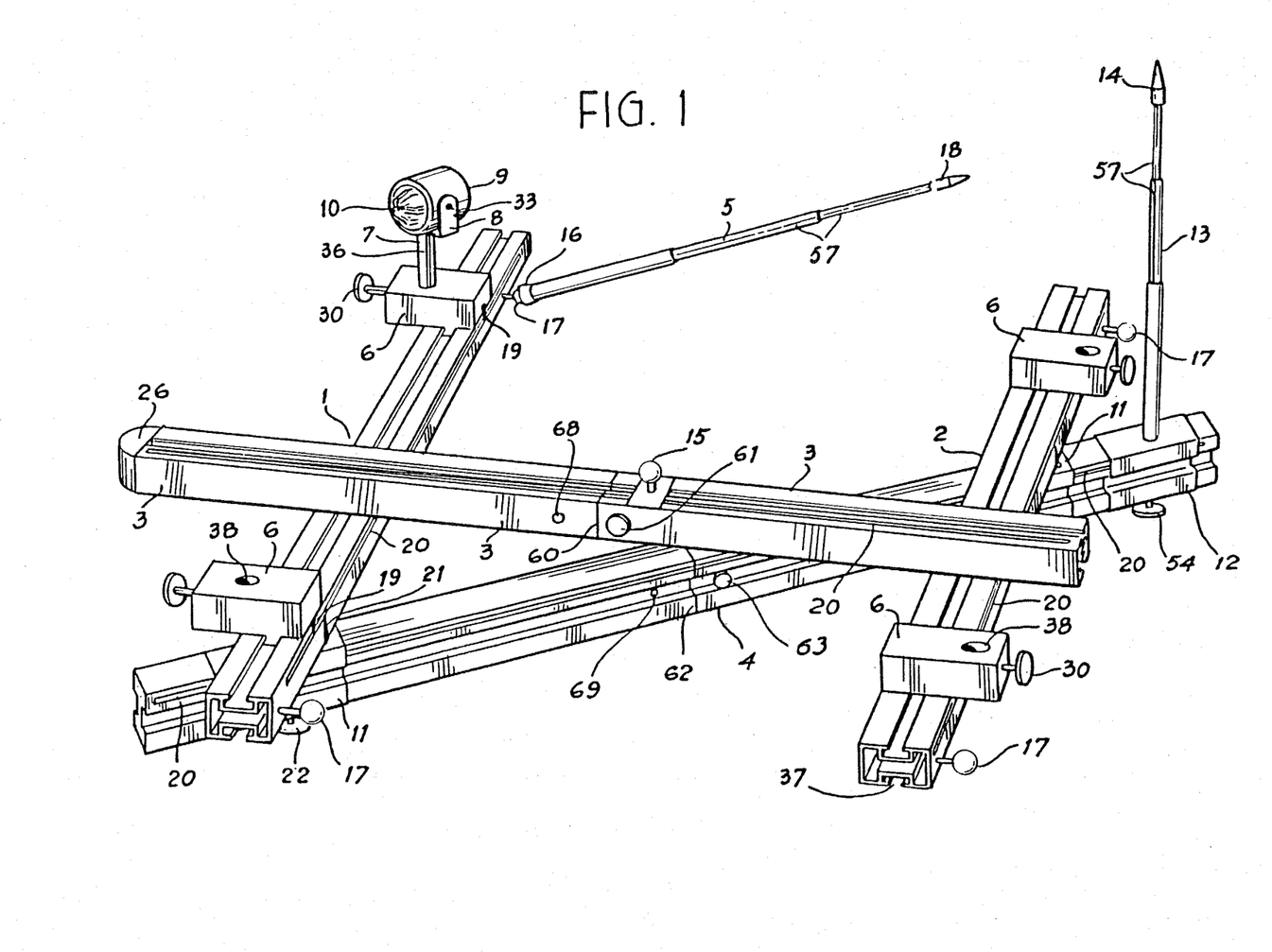
FIG. 1 is a perspective view of the measuring frame of the present invention.
Figure 2:
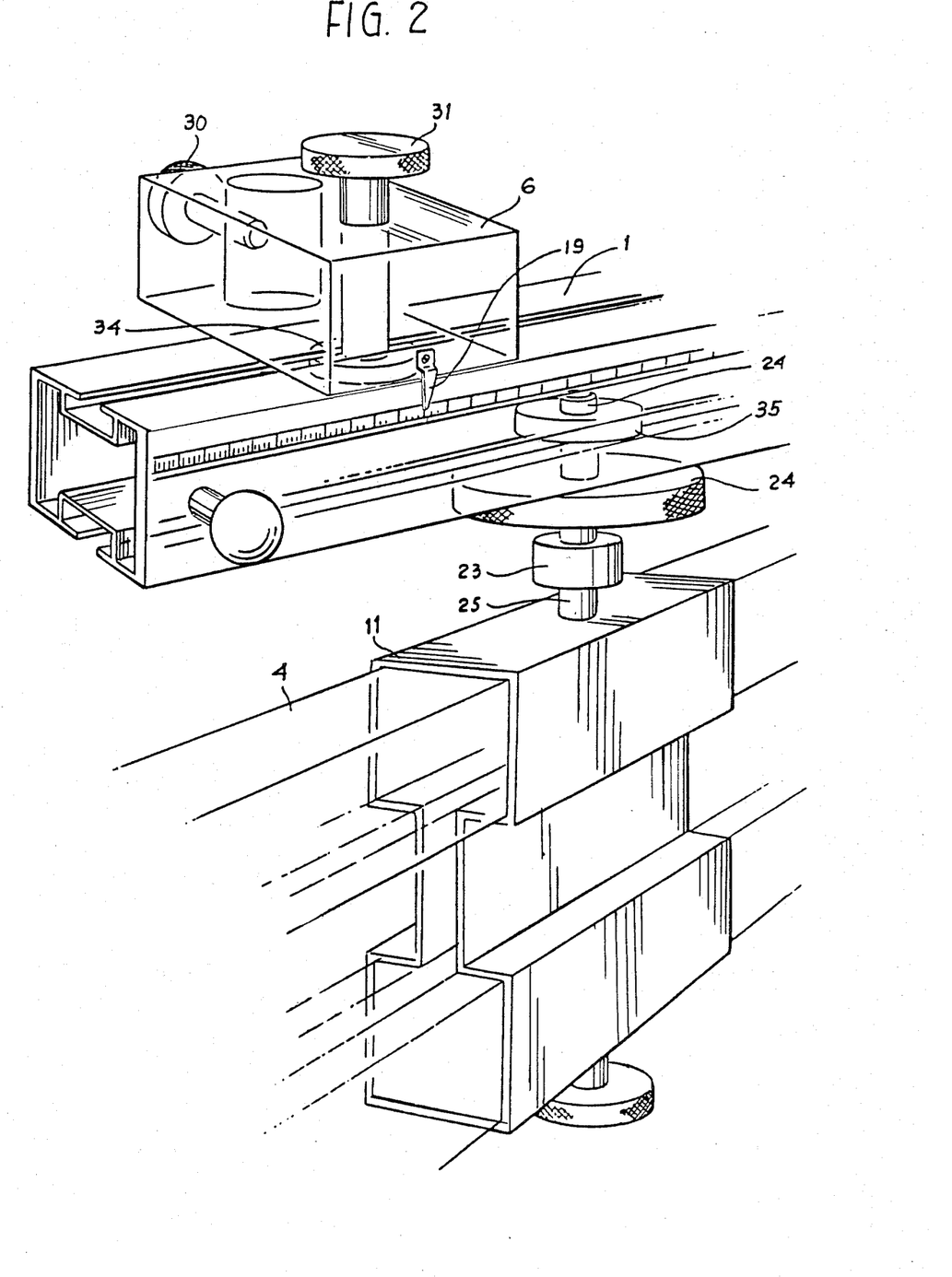
FIG. 2 is a sectional view of a pole attachment, transverse beam and measuring beam.

A measuring beam 4 is adapted below the beams 1 and 2 by means of two quick couplings on attachments 11 so that the measuring beam will hang under the whole device. The attachments 11 for the measuring beam can be pushed and locked to an arbitrary position along the beams 1 and 2. The quick coupling 23 and 25 is fixed to a screw 24, which can be locked to an attaching iron 35, which can slide in the profile of the beams 1 and 2. The quick coupling 23 and 25 is not shown with respect to its function.

Figure 3:
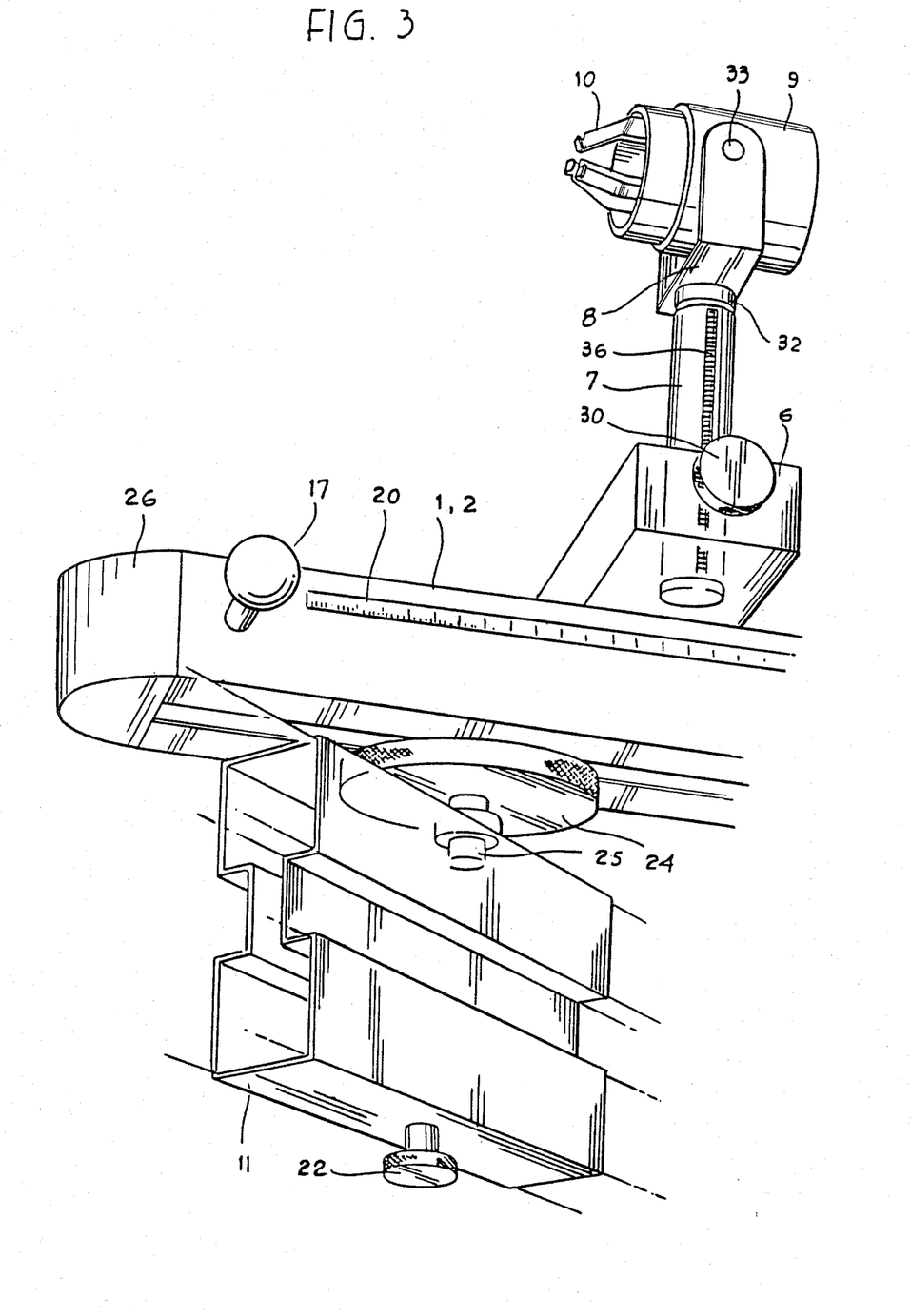
FIG. 3 shows a gripping means with pole attachment.

A measuring rod 5 can be rapidly connected by means of a ball joint 17 to the beam 1 with a quick coupling 16 intended for balls. The measuring rod 5 is of a telescopic type and is provided with a measuring tip 18 and a graduated scale 57. Each beam 1 and 2 is provided with two pole feet 6, which can be locked by means of mounting iron 34 in an arbitrary position along the beams 1 and 2 by a locking screw 31. All pole feet 6 are provided with pole holes 38 and locking screw 30 for vertical adjustment of the pole 7 which is provided with a graduated scale 36. A clamp 8 can be attached to the pole 7 via a quick coupling 32. A gripping means 9 is then articulatedly adapted to the clamp 8 by means of two joints 33 and consequently to the beams 1 and 2. The pole feet 6 are provided with pointers 19 indicating position and showing the position of the foot along a graduated scale 20 on the beams 1 and 2. The gripping means 9 is provided with at least three gripping clutches 10 for clamping to one of the reference points of the vehicle.

It should be observed that all the beams are provided with a scale 20.

At one of its ends, the measuring beam 4 is provided with an attachment 12 for the measuring tip with a locking screw 54. A telescopic pole 13 provided with a measuring tip 14 and a graduated scale 57 is mounted on the attachment 12.

The center beam 3 is on its upper side provided with an adjustable reference ball 15 which can be locked to the beam 3 by means of a locking screw not shown and mounting irons in the beam groove.

The measuring beam 4 can via the attachment 11 be locked to the beams 1 and 2, with locking screw 22, the position being indicated with a pointer 21 along the scale 20.

The beams 1, 2 and 3 can be provided with end sections 26 for protection of the frail beam ends.

Figure 4:
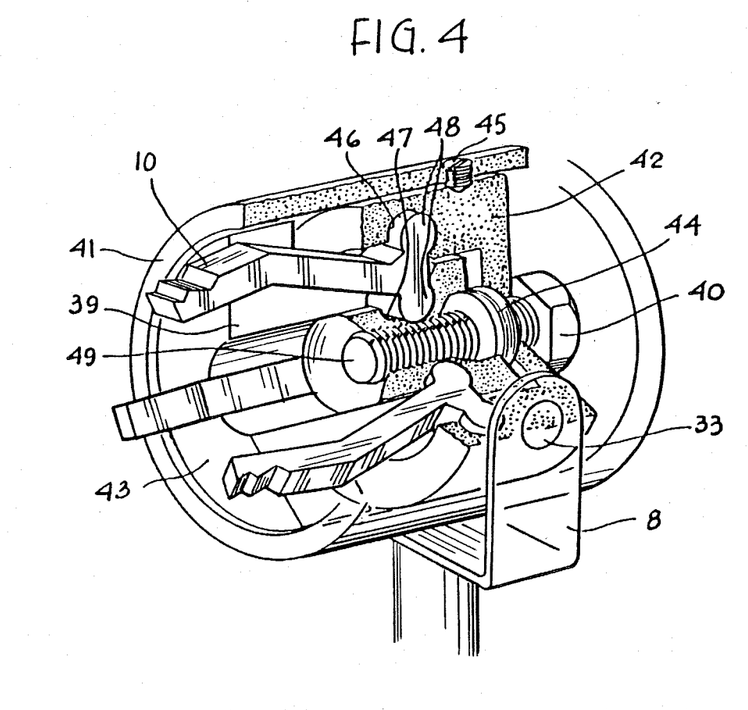
FIG. 4 shows a section of the gripping means.

With reference to FIG. 4, the gripping means 9 is shown in section. The means 9 consists of an adjusting screw 40 and a sleeve 41 within which a piston 43 can slide. A cylinder 42 is rigidly connected to the sleeve 41 by means of a locking screw 45.

The screw 40 can be turned in a central hole of the cylinder 42 and is locked to it by means of a locking ring 44. The cylinder 42 and the piston 43 show two semi-circular concave surfaces 46 and 47 which can move axially relative to each other when the screw 40 is turned. The screw 40 then moves in a threaded central hole 49 of the piston 43.

At least three gripping clutches 10 with double balls are fitted into the concave surfaces 46 and 47 so that the gripping clutches 10 are turned in axial direction when the screw is turned and the surfaces 46 and 47 move axially relative to each other.

In order that the gripping clutches 10 might move axially there are grooves 39 made in the piston 43. When the screw 40 is turned clock-wise the piston will move downwards and the surface 47 as well, the innermost ball 48 of the gripping clutch being compelled downwards so that the gripping clutch moves towards the center and the clutches are closed. If the screw 40 turned in the other direction the clutches are opened instead. Because of the gear of the screw 40 the clutches will be easily clamped with a great force in a reference hole or be clamped around a reference bolt.

Figure 5:
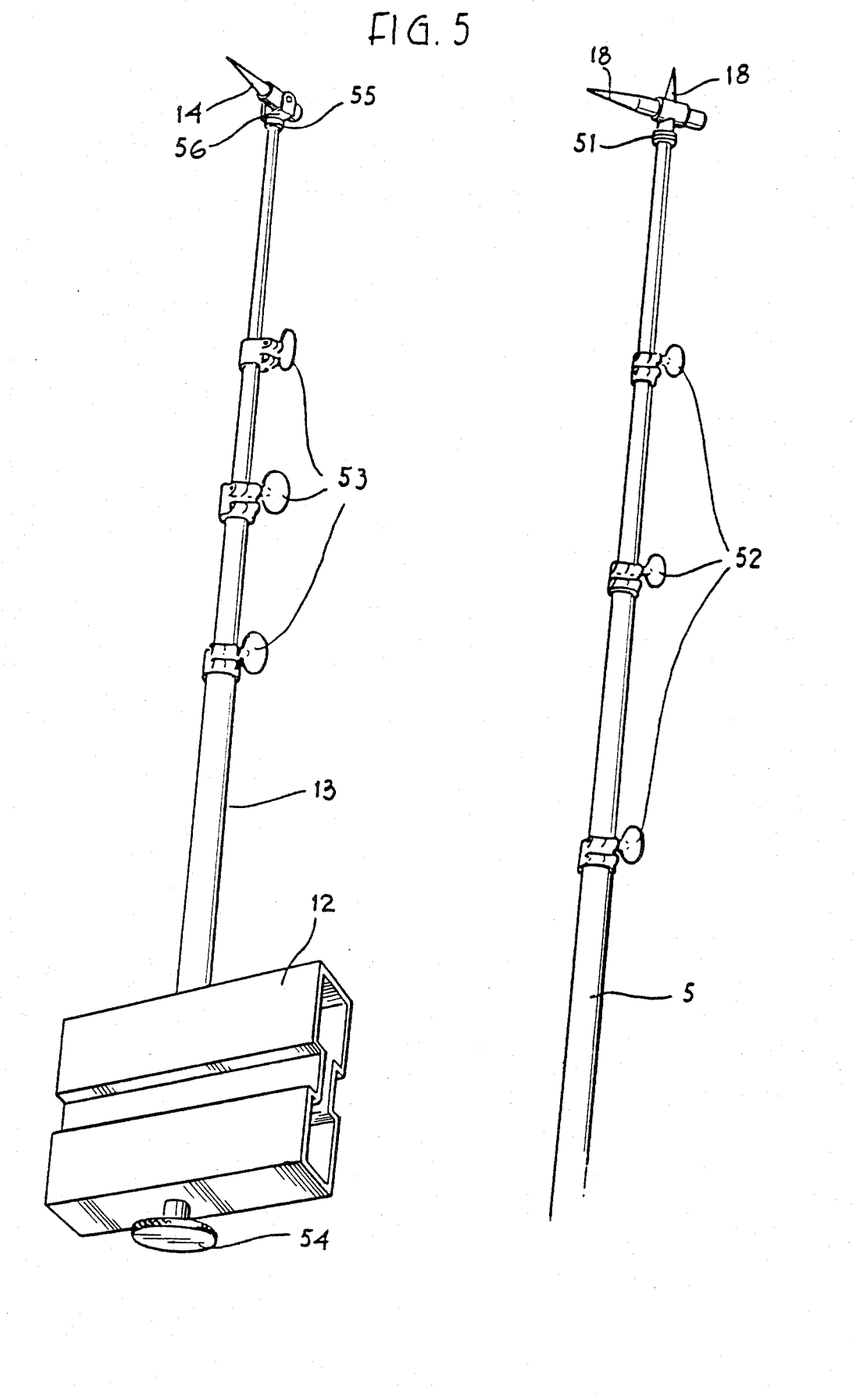
FIG. 5 shows the measuring means with telescopic poles and measuring tips.

FIG. 5 shows the telescopic measuring rod 5 provided with locking rings 52 and double measuring tips 18 as well as an angle bracket 51. Moreover, the attachment 12 for the measuring beam with locking screw 54 and the pole 13 for the measuring tip of a telescopic type with locking rings 53 are shown. The measuring tip 14 is mounted on the pole 13 by means of a locking ring 55 and an angle bracket 56.

The angle bracket 56 is also provided with V-shaped grooves at an angle of 45° for locking the measuring tip 14 which can thus be adjusted in 45° and 90° relative to the measuring pole 13.

The measuring rod 5 and the measuring pole 13 can be given the same design with three different angular settings.

Figure 6A:
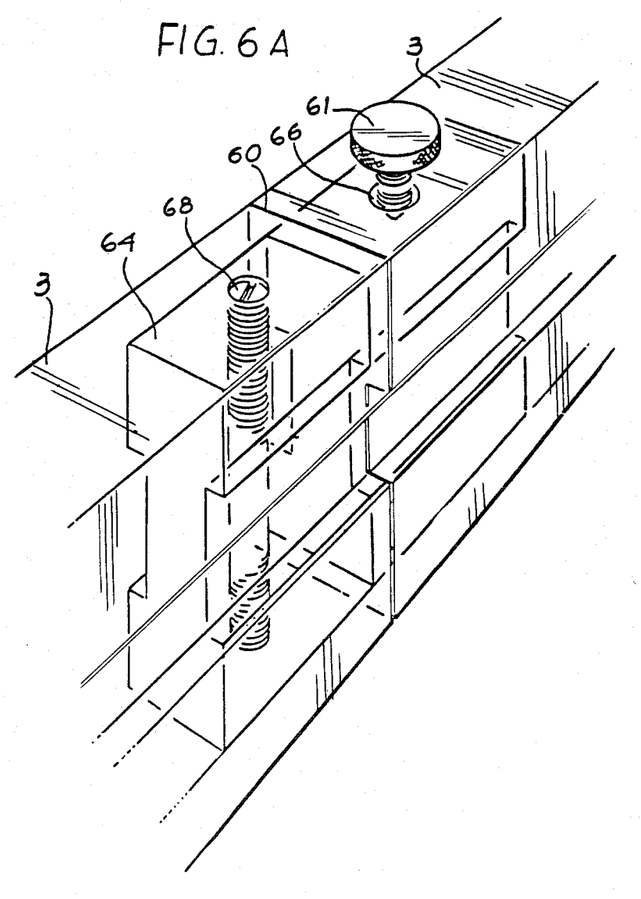
FIG. 6A shows jointing means for beams.

FIG. 6A shows the principle of jointing a beam 3 along the section 60. A jointing iron 64 has been screwed onto the left beam part with a locking screw 68. The jointing iron is further provided with a conical guide 66 so that the right beam portion is guided into position when the locking screw 61 is tightened. The beam 4 can also be jointed along a section 62 by means of a jointing iron 65 not shown which is locked by a locking screw 69. The jointing iron 65 is then provided with a guide groove 67 not shown and is locked by the locking screw 63.

In another illustrative example not shown the reference ball 15 can be replaced with a shaft around which the measuring rod in the form of a beam can be brought into a rotatable relation to said shaft and then be turned in a ground plane. The beam can then be provided with a measuring tip of the same type as the measuring beam 4, and it is then also possible to carry out a height measurement.

In another illustrative example the gripping means 9 can be given another design so that the concave surfaces 46 and 47 and the cooperating balls 48 change positions. The diameter of the gripping means can be considerably reduced in this way. The concave and convex joint surfaces can with advantage be coated with a film of rubber or a similar material to get a soft motion of the gripping clutches without play.

Figure 6B:
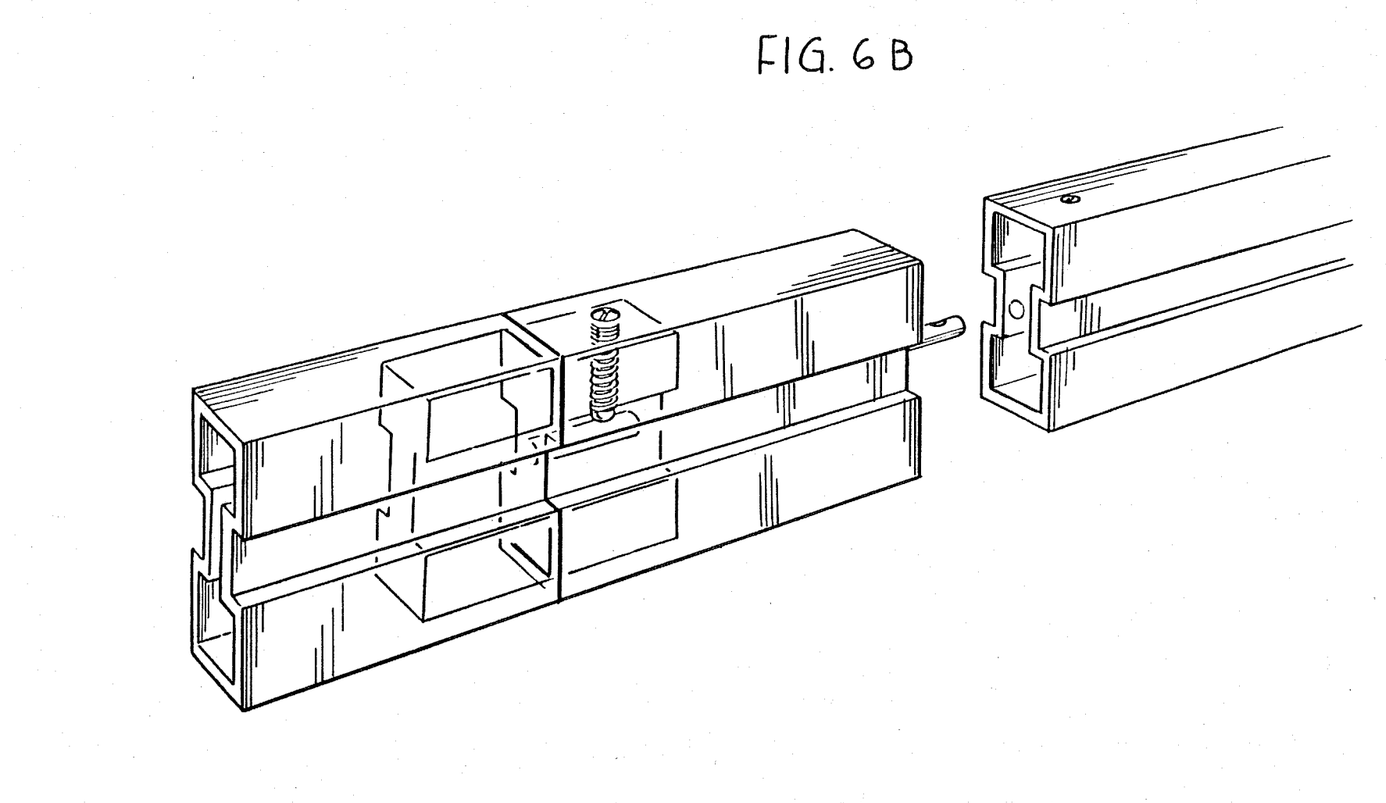
FIG. 6B shows an alternate jointing means for beams.

In another embodiment shown in FIG. 6B the joint 60 has been provided with a quick coupling.

In the operation of the present invention, two reference points symmetrically located on each side of the center line of the vehicle are localized and the vehicle is hoisted up to a suitable working height with the weight left on all four wheels.

All the joints of the measuring device are mounted and four loose gripping means 9 are secured to the selected reference points. The transverse beams 1 and 2 with loose pole feet 6 are then quick coupled to the gripping means with the transverse beams hanging loosely under the vehicle. The pole feet are then adjusted so that these are symmetrically placed on the transverse beams before the pole feet are locked. This is made by controlling the position pointers 19 relative to the graduated scale 20.

When both transverse beams are symmetrically suspended the poles 7 are controlled so that these are adjusted to the same height and that this adjustment is suitable with respect to the chassis of the car.

The center beam 3 is then positioned exactly in the center line of the car by the scales 20 being read.

The measuring beam 4 is then pressed on with two quick couplings and the attachments 11 are adjusted so that the measuring beam is positioned straight below the reference point to be checked. It is an advantage if one of the attachments 11 can be placed centrally on the center line of the vehicle but this is not necessary. It is then started with a fresh point and the attachment 12 and the telescopic pole 13 are adjusted so that the measuring tip 14 is in contact with the reference point. All the parts of the measuring beam are then locked and reading of height can be carried out on the scale 57 and angle reading on the scales 20 on the transverse beams 1 and 2. One of these can thus have been adjusted in advance to 0 by the location of the measuring beam on the center line. Length reading is then carried out on scale 20 of the measuring beam 4. The position of the reference point in the ground plane has now been obtained in the form of a direct length, and one or two measures of the scales 20 on the transverse beams which in principle give the angle relative to the center line.

The corresponding reference point on the other side is measured for control in the same way and the difference in resulting readings is a measure of the displacement. Height difference and lateral and longitudinal displacements can then be easily calculated. An alignment chart can with advantage be prepared for direct reading of the result in mm.

In case there is no height difference it can be comfortable to use the measuring rod 5 for the direct measurement, the reference ball 15 being used.

The whole measurement procedure can be finished in a fraction of one working hour even if several points must be checked.

A certain reference point can be quickly checked by means of finished data sheet by adjusting certain values on the scales. Therefore the device can also be used as a comfortable and quick measuring instrument.

Even if the invention has only been described with a limited number of examples it must be assumed that other embodiments and combinations may be within the scope of the inventive idea.

I claim as my invention:

1. A method of measuring deformations of vehicle frames or bodies comprising the steps of clamping a plurality of gripping means to reference points located in the central portion of the vehicle, coupling two transverse beams to said gripping means, coupling a longitudinal center beam to said transverse beams so that an H-shaped measuring frame is formed which is located in a measuring plane parallel to the ground plane of the vehicle, coupling a measuring beam to said transverse beams with displaceable fastening means so that the measuring beam can be given an arbitrary orientation in said measuring plane, and providing said measuring beam with a measuring pole for measurement in vertical and horizontal directions.

2. The method of claim 1 wherein said transverse beams are provided with one or more measuring rods for direct or cross measurement so that all the other reference points can be checked.

3. A measuring frame for measuring deformations of vehicle frames or bodies characterized in that the measuring frame comprises: two transverse beams which at each end are provided with a gripping means which is adjustably attached in a groove on said beams so that these can be attached prependicularly to the longitudinal axis of the vehicle at four reference points; a longitudinal center beam which can be coupled to said transverse beams so that an H-shaped measuring frame is formed; and a measuring beam attached adjustably on the transverse beams with attachments, and which can be pushed and locked under the H-shaped frame so that the measuring beam can assume an arbitrary angle to the longitudinal direction of the vehicle in a plane parallel to the measuring frame, whereby the measuring beam is provided with a measuring tip for vertical measurement and a measuring rod is adapted to at least one of the transverse beams for direct or cross measurement.

4. The measuring frame of claim 3, characterized in that the beams of the measuring frame are divisible and provided with jointing means, which each comprises jointing irons with a locking screw and a guide which directs the beam joint to a correct position when a second locking screw is tightened so that the beam portions screwed apart will not assume a greater length than there is room for comfortably in a usual suitcase.

5. The measuring frame of claim 3, characterized in that the beams are made of light metal such that when all parts have been packed in a suitcase the total weight will not exceed 25 kg.

6. The measuring frame of claim 3, characterized in that the locking means between the gripping means and the beams consist of bayonet couplings.

7. The measuring frame of claim 3, characterized in that the locking means between the beams and the beams also consist of bayonet couplings.

8. The measuring frame of claim 3, characterized in that the measuring rod and the measuring pole comprise telescopic arms with graduated scales for a rapid and accurate adjustment and reading.

9. The measuring frame of claim 3, characterized in that the transverse beams are provided with scales and the attaching means of the measuring beam are provided with an indicating pointer so that the position of the measuring beam can be read in a simple way.

10. The measuring frame of claim 9, characterized in that the measuring rod has a bayonet coupling intended for balls, so that the measuring rod can be attached simply and rapidly to the ball joints arranged on the beams.

11. The measuring frame of claim 3, characterized in that the gripping means consists of three gripping arms with an articulated contact between a cylinder and a piston by means of balls cooperating with the concave surfaces of said cylinder and piston so that when the centre screw is turned the gripping arms are opened and closed, respectively.

12. The measuring frame of claim 4, characterized in that the jointing means consist of usual bayonet couplings for a simple and rapid connection.

* * * * *